United States Patent [19]

Fattic et al.

[11] Patent Number: 4,509,125
[45] Date of Patent: Apr. 2, 1985

[54] CONTINUOUSLY VARIABLE TRANSMISSION RATIO CONTROL SYSTEM

[75] Inventors: Gerald T. Fattic, Anderson, Ind.; William J. Vukovich, Pittsfield Township, Washtenaw County, Mich.

[73] Assignee: General Motors Corporation, Detroit, Mich.

[21] Appl. No.: 405,909

[22] Filed: Aug. 6, 1982

[51] Int. Cl.³ .................. G06F 15/20; B60K 41/12; B60K 41/18

[52] U.S. Cl. ............................ 364/424.1; 74/866; 474/11; 474/18

[58] Field of Search .............. 364/424.1; 74/866; 474/11, 12, 18, 28

[56] References Cited

U.S. PATENT DOCUMENTS

| 4,107,776 | 8/1978 | Beale | 74/866 X |
|---|---|---|---|
| 4,291,594 | 9/1981 | Baudoin | 74/857 |
| 4,383,456 | 5/1983 | Ganoung | 74/866 |
| 4,387,608 | 6/1983 | Mohl et al. | 74/866 |
| 4,397,379 | 8/1983 | Baudoin | 74/866 X |
| 4,403,974 | 9/1983 | Sherman et al. | 474/11 |
| 4,428,257 | 1/1984 | Meyerle et al. | 74/866 |

Primary Examiner—Felix D. Gruber
Attorney, Agent, or Firm—Mark A. Navarre

[57] ABSTRACT

In a transmission mechanism having an actuator member which is movable to adjust the speed ratio of the transmission, the rate of movement of the actuator member is controlled to provide a desired overall response function. When the ratio error is less than a reference value, the actuator rate of movement is controlled as a function of speed ratio such that the overall rate of change of ratio produces stable response. When the ratio error is at or greater than the reference value, the actuator rate of movement is controlled as a function of ratio error such that the overall rate of change of ratio produces fast response consistant with driveability.

4 Claims, 16 Drawing Figures

CONTINUOUSLY VARIABLE TRANSMISSION RATIO CONTROL SYSTEM

This invention relates to a ratio control system for a continuously variable transmission (CVT), and more particularly to a system for controlling ratio changing in accordance with drivability and stability requirements.

Continuously variable ratio transmissions are well-known in the prior art and exist in a variety of configurations. Generally, the ratio control systems for such transmissions include an inner servo loop for varying the speed or torque ratio between the transmission input and output shafts according to the position of an adjustable control member. An outer servo loop adjusts the position of the control member so that the transmission ratio is varied in a manner to bring the actual ratio into correspondence with a desired ratio determined according to an input torque or speed command.

In a system of the type described above, the gains or transfer functions of the inner and outer servo loops are defined so that the overall gain or transfer function of the ratio control system provides shifting response to satisfy either drivability or stability criteria. The overall gain is thus typically a compromise between drivability which requires fast response and stability which requires slow response.

Since the control forces required in a ratio changing mechanism are relatively high, the inner servo loop referred to above is typically implemented with hydraulic or hydromechanical controls. As a result, the gain of the inner servo loop is not easily varied and likely is nonconstant over the range of transmission ratios. According to conventional servo control techniques, the gain of the outer servo loop is consequently limited by the maximum gain of the inner servo loop in order to provide stable overall response. Reliance on such techniques is considered undesirable since stable response is only attained at the expense of drivability.

Accordingly, it is an object of this invention to provide an improved ratio control system for a continuously variable transmission wherein the overall gain of the ratio control system provides stable response consistent with satisfactory drivability.

It is a further object of this invention to provide an improved ratio control system for a transmission of the above type wherein the gain of the outer servo loop is controlled to yield an overall control system gain that provides fast shifting response when the difference between the actual and desired ratios is such that drivability is the primary control objective, and slow shifting response when the difference between the actual and desired ratios is such that stability is the primary control objective.

It is a still further object of this invention to provide an improved ratio control system of the above type wherein the outer servo loop gain that provides slow shifting response is related to the inner servo loop gain such that the rate of change of ratio is substantially constant with respect to time for all transmission ratios even though the gain of the inner servo loop varies as a function of transmission ratio.

These objects are carried forward by establishing a reference ratio error between the actual speed ratio and a desired speed ratio above which the primary control objective is speed of response consistent with satisfactory drivability, and below which the primary control objective is stable response with limited overshoot of the actual speed ratio relative to the desired speed ratio.

When the difference between the actual and desired speed ratios—the speed ratio error—is below the reference speed ratio error, the gain of the outer servo loop is controlled as an inverse function of the nonconstant gain of the inner servo loop relative to actual speed ratio. In this way, the overall response of the ratio control system provides a substantially constant rate of change of ratio with respect to time for all speed ratio values even though the gain of the inner servo loop varies as a function of speed ratio. The constant rate of change of ratio is chosen to result in limited overshoot of the actual speed ratio relative to the desired speed ratio so that the overall response is stable for all speed ratio values. Such operation is designated as the slow or stable mode of operation and provides repeatable response throughout the range of transmission ratios.

According to a first embodiment of this invention, the gain of the outer servo loop is controlled as a function of speed ratio error when the speed ratio error is at or above the reference speed ratio error so that the overall response provides satisfactory shift feel.

According to a second embodiment of this invention, the gain of the outer servo loop is controlled as a function of both speed ratio error and actual speed ratio when the speed ratio error is at or above the reference speed ratio error. Unlike the first embodiment, the second embodiment compensates for the nonconstant gain of the inner servo loop for all values of speed ratio error. In either case, the primary control objective is drivability or satisfactory shift feel and operation under such conditions is designated as the fast mode of operation.

Figure 1:
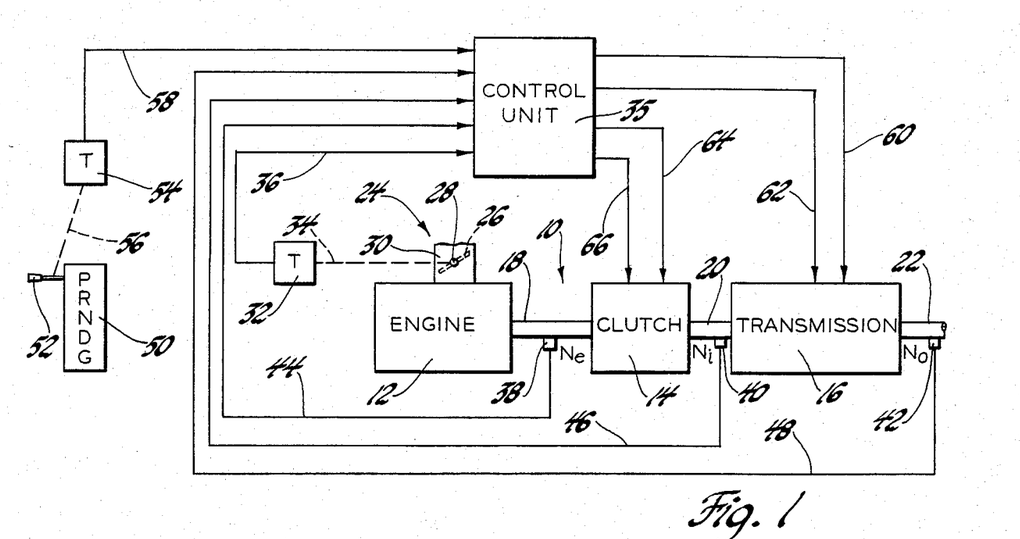
FIG. 1 is a block diagram of a motor vehicle drive train and a control unit for implementing the ratio control system of this invention.

Referring now more particularly to FIG. 1, reference numeral 10 generally designates a motor vehicle drive train comprising engine 12, a forward and reverse clutch mechanism 14 and a continuously variable ratio transmission 16. The engine output shaft 18 drives transmission input shaft 20 through clutch mechanism 14 and transmission output shaft 22 is connected to a differential or the driving wheels of a vehicle (not shown) in a conventional manner.

Reference numeral 24 generally designates an engine throttle comprising a butterfly valve 26 pivoted about pin 28 within housing 30 for controlling the power output of engine 12. Throttle 24 may be controlled in a conventional manner as by an accelerator pedal (not shown) through a suitable linkage mechanism (also not shown). A transducer 32, such as a rotary potentiometer is responsive to the position of throttle 24 as indicated by dashed lines 34, and the output of transducer 32 which is indicative of the throttle position is applied as an input to a control unit 35 via line 36.

Transducers 38, 40 and 42 are responsive to the rotary speed of shafts 18, 20 and 22, respectively, the outputs of such transducers being connected as inputs to control unit 35 via lines 44, 46 and 48. Transducers 38, 40 and 42 each may be a conventional device such as a variable reluctance magnetic speed pick-up wherein a magnetic circuit intermittently cooperates with the teeth of a wheel or gear connected to the respective shaft for rotation therewith. The output of transducer 38 is thus indicative of the speed of shaft 18 and such speed is designated as $N_e$. The output of transducer 40 is indicative of the speed of shaft 20 and such speed is designated by $N_i$. The output of transducer 42 is indicative of the speed of shaft 22 and such speed is designated by $N_o$.

Reference numeral 50 designates a manually operated gear range selector in the passenger compartment of the vehicle, including a control lever 52 movable to one of the five designated positions. The positions of range selector 50 are similar to those found in conventional motor vehicles, the position "P" representing Park, the position "R" representing Reverse, the position "N" representing Neutral, the position "D" representing Drive and the position "G" representing Grade—a forward drive range requiring high output torque.

Transducer 54 is responsive to the movement of control lever 52 as indicated by dashed line 56 and develops an output signal indicative of the range position to which control lever 52 is pointed. Such output is connected as an input to control unit 35 via line 58.

Control unit 35 is operative in response to each of the above-mentioned inputs to output control signals for transmission 16 and clutch 14. The control signals for transmission 16 include an actuator control signal on output line 60 for controlling the position of a ratio control member, and a pressure control signal on output line 62 for regulating the working hydraulic pressure in transmission 16. The control signals for clutch 14 include an actuator control signal on output line 64 for controlling clutch engagement and disengagement, and a pump control signal on output line 66 for providing increased cooling of the clutch friction surfaces when the slippage between such surfaces exceeds a reference value.

Figure 2:
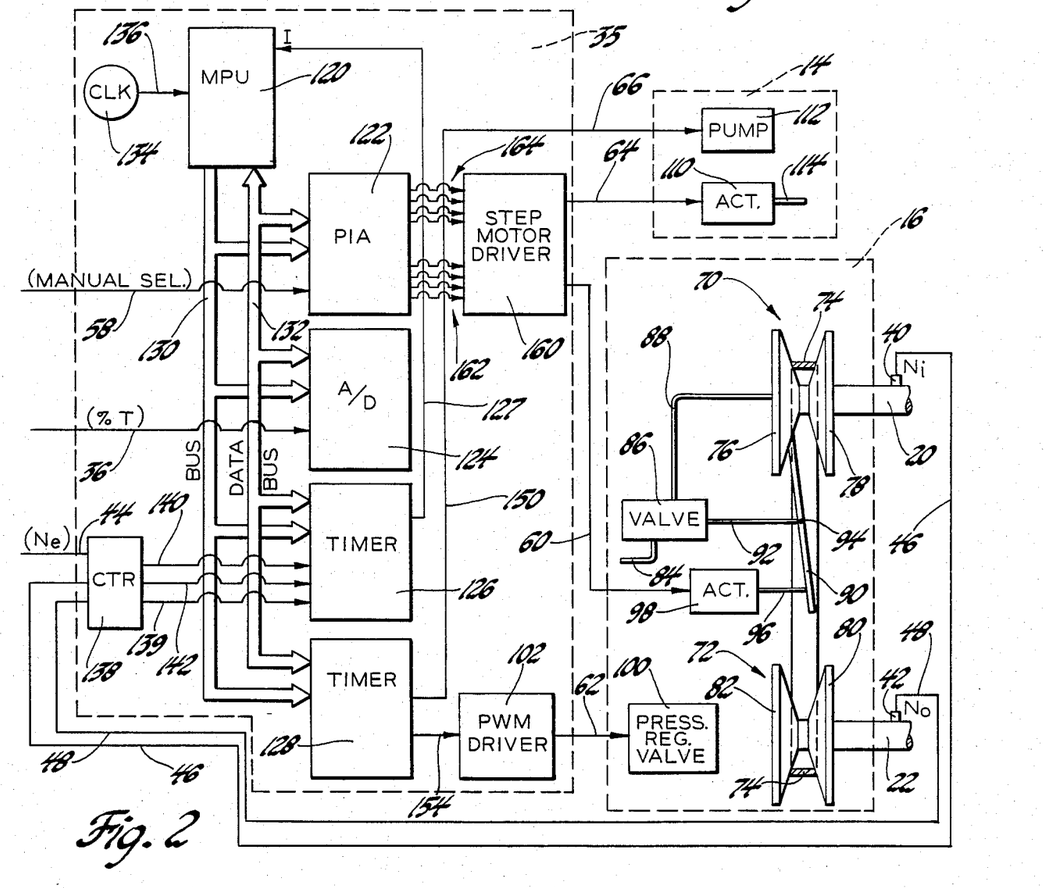
FIG. 2 is a more detailed diagram of the transmission and control unit depicted in FIG. 1.

In FIG. 2, transmission 16, clutch 14 and control unit 35 are shown in somewhat more detail. The various lines and devices depicted in FIGS. 1 and 2 have been assigned corresponding reference numerals. Thus, the speed signals $N_e$, $N_i$ and $N_o$, the throttle signal, and the manual range selector signal are applied to control unit 35 via lines 44, 46, 48, 36 and 58, respectively. Also, control unit output lines 60 and 62 are connected to transmission 16 and control unit output lines 64 and 66 are connected to clutch 14. For simplicity, engine 12, shaft 18 and transducers 32, 38 and 54 are not shown.

Transmission 16 comprises an input pulley, designated generally by reference numeral 70, connected to transmission input shaft 20 for rotation therewith, and an output pulley, designated generally by reference numeral 72, connected to transmission output shaft 22 for rotation therewith. A V-belt 74 is supported on the inner conical surfaces of pulleys 70 and 72. The pulley half 76 of input pulley 70 is axially movable relative to the pulley half 78, and the pulley half 80 of output pulley 72 is axially movable relative to the pulley half 82.

A regulated control pressure derived from a fluid pressure source (not shown) urges pulley half 80 toward pulley half 82, and a further higher control pressure in line 84 is applied through valve 86 and line 88 to a piston mechanism (not shown) in input pulley 70 for moving pulley half 76 relative to pulley half 78. Movement of pulley half 76 relative to pulley half 78 in response to the control pressure in line 88 increases or decreases the effective diameter of input pulley 70, and such movement brings about a complementary movement of pulley half 80 with respect to pulley half 82 to decrease or increase the effective diameter of output pulley 72. V-belt 74 is supported at the effective diameter of input pulley 70 and output pulley 72. In this way, the movement of pulley half 76 with respect to pulley half 78 is controlled to vary the speed or torque ratio between transmission input shaft 20 and transmission output shaft 22 in a continuous or stepless manner.

Lever 90 is pivotally mounted on valve rod 92 at point 94. One end of lever 90 rests against the inner conical surface of pulley half 76 while the other end of lever 90 rests against shaft 96 of linear actuator 98. Valve rod 92 is depicted in the null or steady state position. Movement of valve rod 92 from the null position, due to movement of either pulley half 76 or actuator shaft 96, causes valve 86 to alter the pressure in line 88 in a manner to move pulley half 76 for restoring valve rod 92 to the null position.

In view of the above, it will be understood that the speed ratio between transmission output shaft 22 and transmission input shaft 20 ($N_o/N_i$) may be changed in a stepless manner over a range of ratios defined by the diameters of pulleys 70 and 72 as determined by linear actuator 98 which is energized via line 60 to adjust the lineal position of shaft 96.

A more detailed description of the transmission ratio control mechanism described above is given in copending U.S. patent application Ser. No. 209,955, now Pat. No. 4,403,974, issued Sep. 13, 1983 application being incorporated herein by reference.

Transmission 16 further includes a pressure regulator valve 100, which in conjunction with the pressure source referred to above, develops a regulated fluid pressure for various hydraulic transmission lines such as line 84. The output of pressure regulator valve 100 is typically referred to as the transmission line pressure, and the line pressure is varied as a function of the throttle position and speed ratio to prevent belt 74 from slipping on pulley 70 and 72 under varying load conditions. In the illustrated embodiment, pressure regulator valve 100 includes a solenoid operated valve member (not shown) for adjusting the transmission line pressure according to a pulse width modulated (PWM) energization signal from PWM driver 102 via line 62.

The control elements in clutch mechanism 14 include a linear actuator 110 and an electric motor driven lubrication pump 112. The shaft 114 of actuator 110 moves in a lineal direction in response to the energization of actuator 110 via line 64, shaft 114 being adapted to move one clutch element (not shown) relative to another for establishing a driving connection between engine output shaft 18 and transmission input shaft 20. Lubrication pump 112 is energized via line 66 to lubricate the clutch surfaces when the slippage between the clutch elements of clutch mechanism 14 exceeds a reference value.

It will be recognized, of course, that this invention is independent of the exact nature of linear actuators 98 and 110. For the purposes of this description, however, it will be assumed that actuators 98 and 110 are conventional step motors, having lineal output shaft movement.

In the illustrated embodiment, control unit 35 is a microprocessor-based controller comprising microprocessor (MPU) 120, Peripheral Interface Adapter (PIA) 122, Analog-to-Digital converter (A/D) 124, and Timers 126 and 128. MPU 120 communicates with the above-described elements in a conventional manner via Address and Control bus 130 and via bi-directional Data bus 132. Clock 134 provides a high frequency clock pulse train to MPU 120 via line 136 for timing the operation and interaction of the various control elements. Each of the elements including MPU 120 may be any of a number of known commercially available devices. For example, MPU 120 may be a MC6802, PIA 122 may be a MC6821 and Timers 126 and 128 may be MC6840's, all manufactured by Motorola Semiconductor Products, Inc. Analog-to-Digital converter 124 may be an ADC808 manufactured by Analog Devices Corporation. Analog inputs, such as the throttle signal on line 36, are applied as inputs to A/D converter 124, while digital input signals, such as manual selector signal on line 58, are applied as inputs to PIA 122. The speed signals on lines 44, 46 and 48 are each applied in a conventional manner as an input to a counter, each such counter being included within the counter block designated by reference numeral 138.

Timers 126 and 128 are programmable and receive a clock signal, such as from clock 134, for performing various timing and counting functions. Timers 126 and 128 each include three separate timer modules which are controlled by MPU 120 via Address and Control bus 130 and Data bus 132. The outputs of the counters in counter block 138 are applied as inputs to Timer 126 via lines 139, 140 and 142. Timer 126 operates to convert the output signals from counter 138 to digital representations of the rotational speeds of the respective shafts and, as will later be described, to generate an interrupt signal for MPU 120 on line 127. Timer 128 operates, as will later be described, to develop actuation signals for lubrication pump 112 and PWM driver 102 on lines 150 and 154, respectively. According to the preferred embodiment, MPU 120 includes memory elements of the read-only (ROM) and random-access (RAM) type. As is well-known, the random-access memory is used for the temporary retention of information such as input signal values while the read-only-memory is used for the permanent retention of data tables and program instructions.

The output commands for linear actuators 98 and 110 are applied to driver circuit 160 via the lines generally designated by reference numerals 162 and 164. Driver 160 may be a conventional step motor translater or driver and operates in a manner to energize actuators 98 and 110 via lines 60 and 64 in accordance with the actuator commands on lines 162 and 164.

Figure 3:
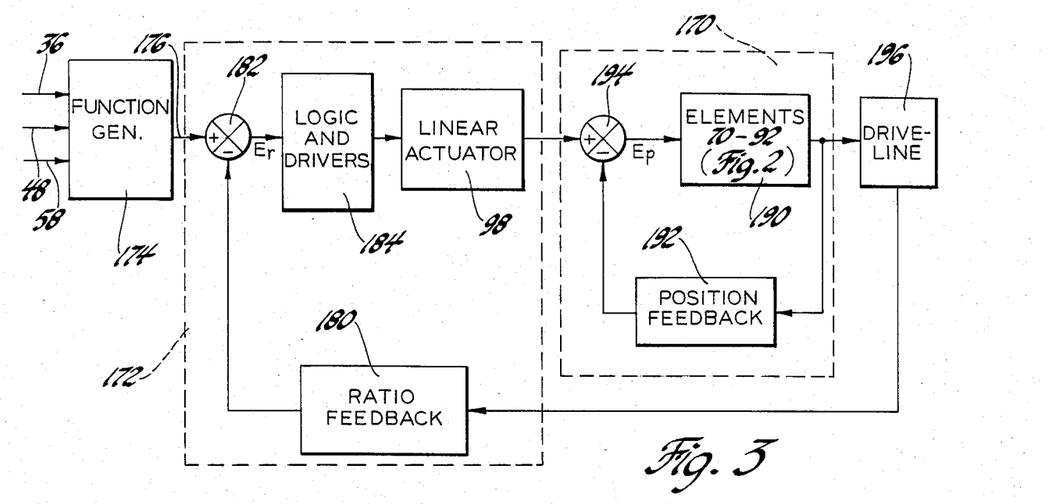
FIG. 3 is a control system diagram for the ratio control system of this invention.

FIG. 3 is a control system diagram for control unit 35 and the ratio control elements of transmission 16, illustrating the elements comprising the inner and outer servo loops. It will be understood that this diagram is a schematic representation of the system shown in FIGS. 1 and 2. The inner servo loop is designated by reference numeral 170 and the outer servo loop is designated by reference numeral 172.

A function generator 174 generates a desired speed ratio for transmission 16 on line 176 according to the parameters of throttle position on line 36, transmission output speed on line 48 and manual selector position on line 58. Such function is implemented by MPU 120 via a look-up table or other conventional function generating mechanism.

The outer servo loop 172 essentially comprises: the linear actuator 98, a ratio feedback designated by reference numeral 180 for determining the actual speed ratio, a summing junction as designated by block 182 for generating a signal corresponding to the difference between the actual and desired speed ratios to form a speed ratio error signal designated as $E_r$, and a logic and driver circuit, designated by block 184 for responding to the speed ratio error and energizing linear actuator 98 in a corrective manner. Blocks 180-184 are thus implemented by control unit 35, and block 98 is physically included in transmission 16.

Inner loop 170 essentially comprises: transmission ratio control elements as indicated at block 190 including valve 86 and the piston mechanism referred to in reference to FIG. 2, position feedback elements, as indicated at block 192 including lever 90 for mechanically indicating the position of pulley half 76, and summing junction elements, as indicated at block 194 including valve rod 92 for determining the position error $E_p$ between the actual position of pulley half 76 and a position corresponding to the lineal shaft position of actuator 98. Thus, each of the inner servo loop elements are contained within the transmission 16.

The transmission drive line elements are directly controlled by inner servo loop 170. Such elements are indicated at block 196 and include shafts 20 and 22, pulleys 70 and 72 and V-belt 74.

The inner and outer servo loops 170 and 172 thus operate together to establish a transmission speed ratio that corresponds to the desired speed ratio determined by function generator 74. The inner servo loop 170 controls the transmission elements 70-92 to establish a transmission speed ratio corresponding to the lineal position of actuator output shaft 96. Accordingly, the gain of inner servo loop 170 may be expressed in terms of the change in speed ratio per unit change in actuator shaft position—ratio/inch, for example. Such gain is not easily modified, and as will be described in reference to FIGS. 4 and 5, is typically a nonconstant function of the actual speed ratio provided.

The outer servo loop controls actuator 98 to establish an actuator output shaft position corresponding to the desired speed ratio. The outer servo loop 172 controls not only the direction of lineal movement of the actuator shaft 96, but also its rate of change of movement with respect to time. The direction of movement is determined strictly according to whether the actual ratio is above or below the desired speed ratio while the rate of change of movement is varied in a manner to satisfy stability and drivability criteria. The gain of the outer servo loop 172 may thus be described in terms of a movement per unit time—inches or steps per second, for example.

The overall gain of the control system is the product of the gains of the inner servo loop 170 and the outer servo loop 172. Using the units of gain given above, it will be seen that the overall gain may be expressed in terms of ratio per second. The output parameter of ratio per second directly affects the stability of the control system as well as the drivability of shift feel experienced by the occupants of the vehicle. This invention relates to a control system for the outer servo loop 172 for controlling the rate of change of ratio with respect to time to provide a stable overall response without sacrificing drivability.

Figure 4:
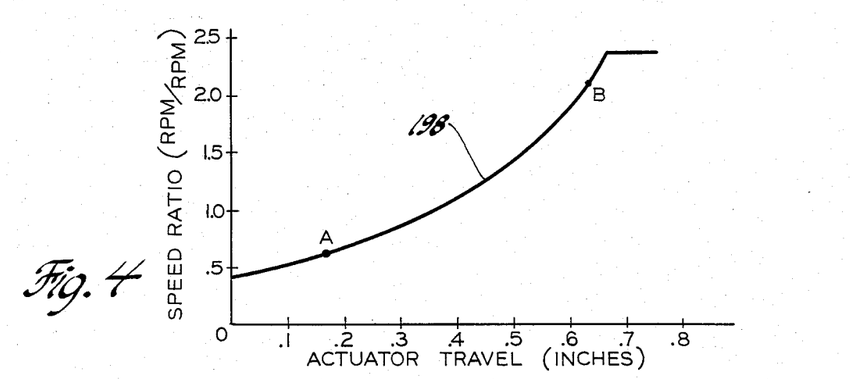
FIG. 4 is an empirically derived graph depicting transmission speed ratio versus actuator position.
Figure 5:
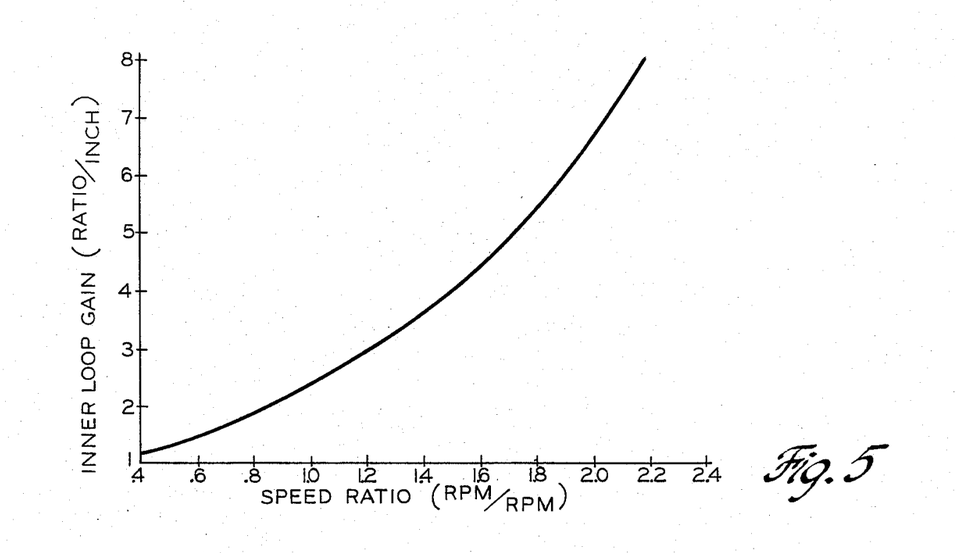
FIG. 5 is a graph depicting the inner loop gain versus speed ratio.

Referring now to FIG. 4, curve 198 depicts an empirically determined relation between the speed ratio ($N_o/N_i$) of transmission 16 and the lineal position of actuator output shaft 96. The travel or position of shaft 96 is given in inches, where zero inches corresponds to the fully withdrawn position and where 0.75 inches corresponds to the fully extended position. The change in speed ratio for a given change in the position of shaft 96 represents the gain of the inner servo loop 170 and is given by the slope of curve 198. For example, the gain of the inner servo loop 170 is approximately 1.5 ratio/inch when the speed ratio is 0.6 RPM/RPM as depicted at point A, while the gain is approximately 7.3 ratio/inch when the speed ratio is 2.10 RPM/RPM as depicted at point B. Thus, the gain of the inner loop 170 is greater when the speed ratio is at a high numerical value such as 2.10 RPM/RPM than when the speed ratio is at a low numerical value such as 0.6 RPM/RPM. Alternately, one could describe the inner loop gain variation as a function of the lineal position of actuator shaft 96.

The variation in gain of inner servo loop 170 in ratio/inch is shown in FIG. 5 as a function of actual speed ratio. Since the graphs depicted in FIGS. 4 and 5 were empirically derived from the transmission mechanism described in the above-referenced Ser. No. 204,955 and in FIG. 2 herein, it will be understood that such relation may not be the same as for other continuously variable transmission mechanisms. However, transmission 16 is felt to be typical of most transmission mechanisms in that its inner loop gain is nonconstant over the range of speed ratios provided. That is, the gain of a different transmission mechanism will likely differ from the relation shown in FIG. 5, but the gain for such different transmission mechanism will also likely be nonconstant as a function of the actual speed ratio.

Figure 6:
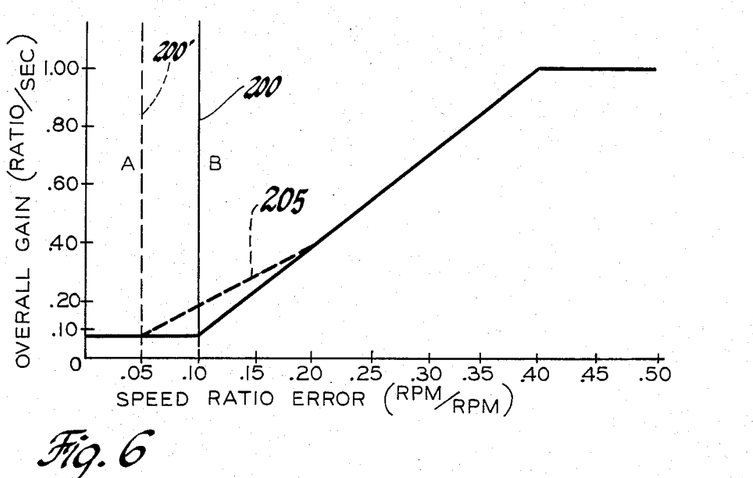
FIG. 6 is a graph depicting the desired rate of change of speed ratio (overall gain) versus speed ratio error.

In FIG. 6, the desired rate of change of speed ratio with respect to time (overall gain) is plotted as a function of the speed ratio error magnitude. As indicated above, the overall gain in ratio/second directly affects stability and drivability criterion. Generally speaking, a slow overall gain is required to provide a stable response while a fast overall gain is required to provide the proper speed of response for drivability considerations. The control problem is further compounded by the nonconstant nature of the inner loop gain as depicted in FIG. 5. To overcome such inherent difficulties and tradeoffs, this invention provides a novel outer loop control system wherein a reference speed ratio error is established above which the primary control objective is speed of response (drivability) and below which the primary control objective is response stability. According to a first embodiment, such reference speed ratio error is 0.10 RPM/RPM and is designated by the solid line 200. According to a second embodiment, such reference speed ratio error is 0.05 RPM/RPM and is designated by the broken line 200'. The desired response curve of FIG. 6 is thus split into a region A for speed ratio errors less than the reference error and a region B for speed ratio errors greater than the reference error. The broken line 205 represents the desired overall gain for the second embodiment, wherein the reference error is 0.05 RPM/RPM.

In region A, stability is the primary control objective and the desired overall gain is chosen so that the actual speed ratio is brought into correspondence with the desired speed ratio with an acceptably small amount of overshoot. In the illustrated embodiment, such gain is constant at approximately 0.08 ratio/second. In region B, speed of response or drivability is the primary control objective and the gain therein is chosen according to drivability standards, the transmission mechanism being a limiting factor for large ratio error magnitudes. In the illustrated embodiment, the gain in region B varies directly as a function of ratio error magnitude and is limited at approximately 1.0 ratio/second.

The reference ratio errors designated by lines 200 and 200' and the desired gain in region A of 0.08 ratio/second are determined theoretically in order to satisfy the desired stability, given the drivability response of region B. As will later be apparent, the improved response of the second embodiment relative to the first embodiment permits the reference ratio error therefor to be set at a lower value (0.05 RPM/RPM) than for the first embodiment (0.10 RPM/RPM).

According to an important aspect of this invention, the nonconstant gain of the inner servo loop 170 is also taken into account in the development of the gain of the outer servo loop 172. In a first embodiment, the gain of the outer servo loop is varied according to actual speed ratio in region A to provide the desired stability by compensating for the nonconstant inner loop gain, and strictly according to speed ratio error magnitude in region B. In a second embodiment of this invention, the gain of the outer servo loop 172 is varied according to actual speed ratio in region A to provide the desired stability, and according to both the speed ratio error magnitude and actual speed ratio in region B to thereby compensate for the nonconstant inner loop gain over the entire range of speed ratio errors.

Figure 9:
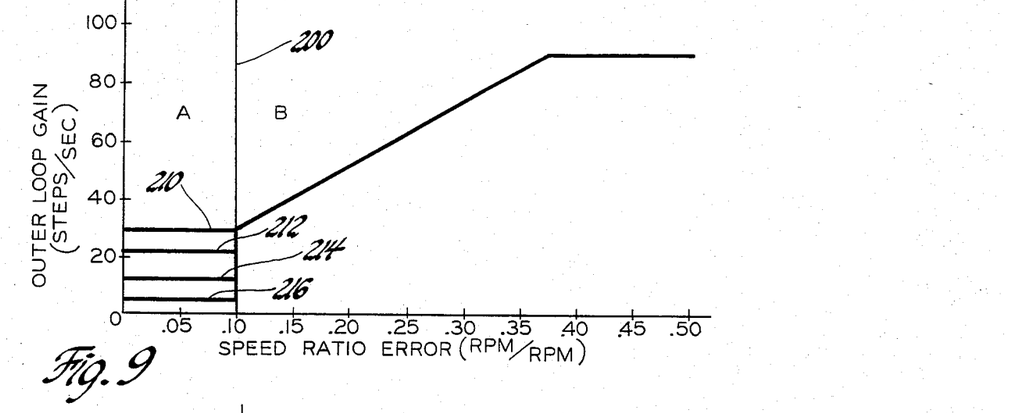
FIG. 9 is a graph depicting the outer loop gain versus speed ratio error according to the first embodiment of this invention.
Figure 10:
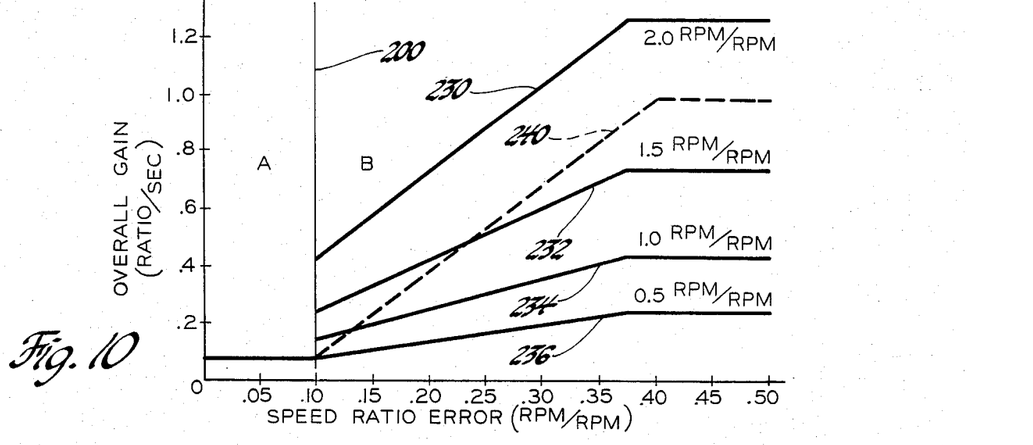
FIG. 10 is a graph depicting the overall gain versus speed ratio error in the fast response mode of operation according to the first embodiment of this invention. A family of curves based on speed ratio are given.
Figure 11:
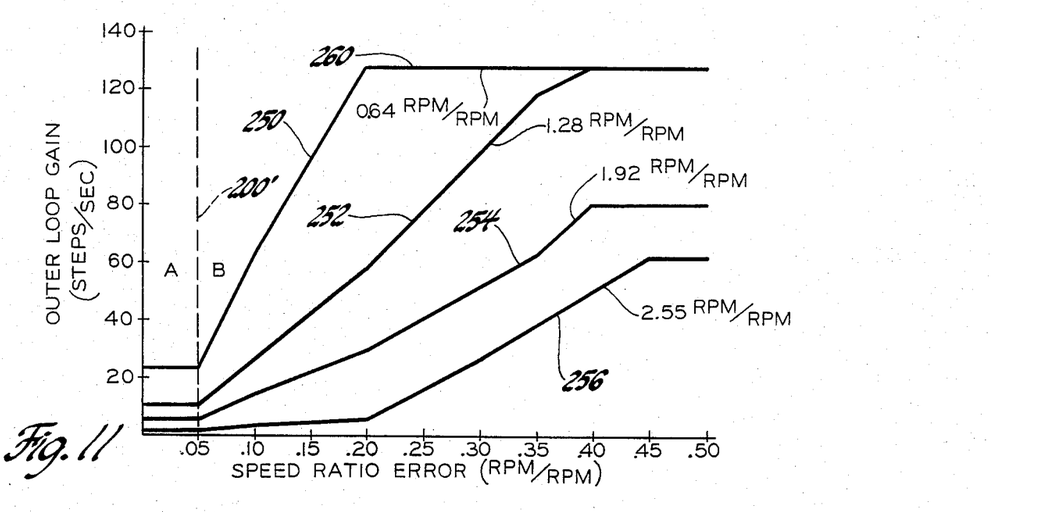
FIG. 11 is a graph depicting outer loop gain versus speed ratio error according to a second embodiment of this invention. A family of curves based on speed ratio are given.
Figure 12:
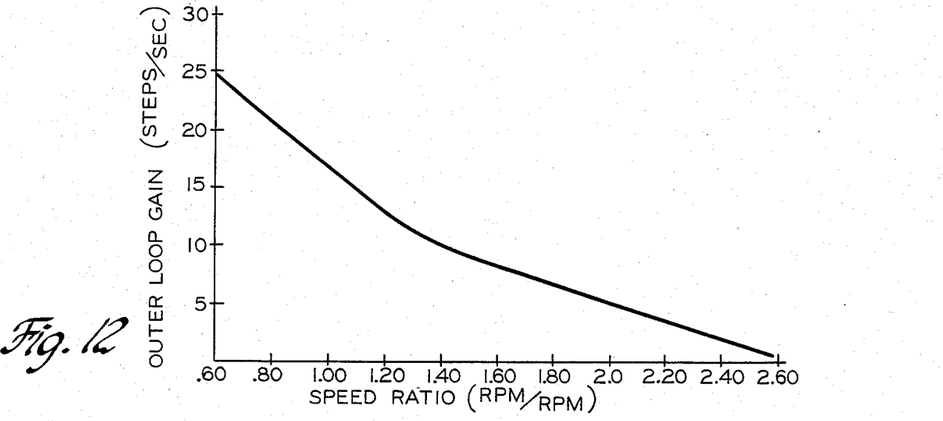
FIG. 12 is a graph depicting outer loop gain versus speed ratio in the slow or stable mode of operation according to the second embodiment of this invention.
Figure 13:
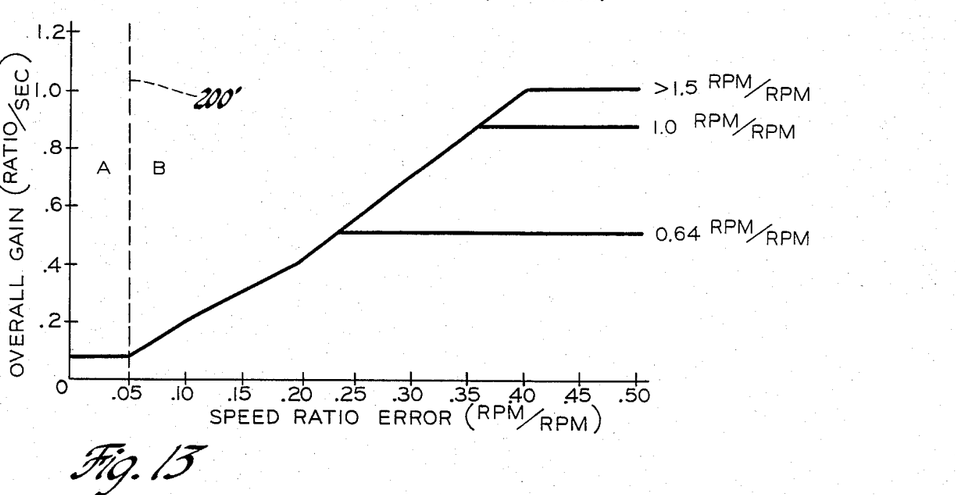
FIG. 13 is a graph depicting the overall gain versus speed ratio error according to the second embodiment of this invention. A family of curves based on speed ratio are given.

The first embodiment is graphically depicted in FIGS. 7-10 while the second embodiment is graphically depicted in FIGS. 11-13. In each case, the outer servo loop gain is expressed in steps/second since the actuator 98 is depicted as a stepper motor. Since one step corresponds to a specified lineal movement of actuator shaft 96, the gain could equally be expressed in inches/second or centimeters/second.

FIG. 9 depicts the gain of the outer servo loop in steps/second as a function of speed ratio error for regions A and B according to the first embodiment of this invention. As in FIG. 6, the line 200 separates region A and region B speed ratio errors. In region B, the outer loop is varied as a sole function of speed ratio error while in region A, the outer loop gain is varied as a sole function of speed ratio. Accordingly, the outer loop gain in FIG. 9 is depicted as a constant function of speed ratio error for region A, the various family curves in region A being associated with a specified speed ratio value. Thus, the curve 210 is associated with a speed ratio value of 0.30 RPM/RPM; the curve 212 is associated with a speed ratio value of 0.64 RPM/RPM; the curve 214 is associated with a speed ratio value of 1.28 RPM/RPM; and, the curve 216 is associated with a speed ratio value of 1.92 RPM/RPM.

Figure 7:
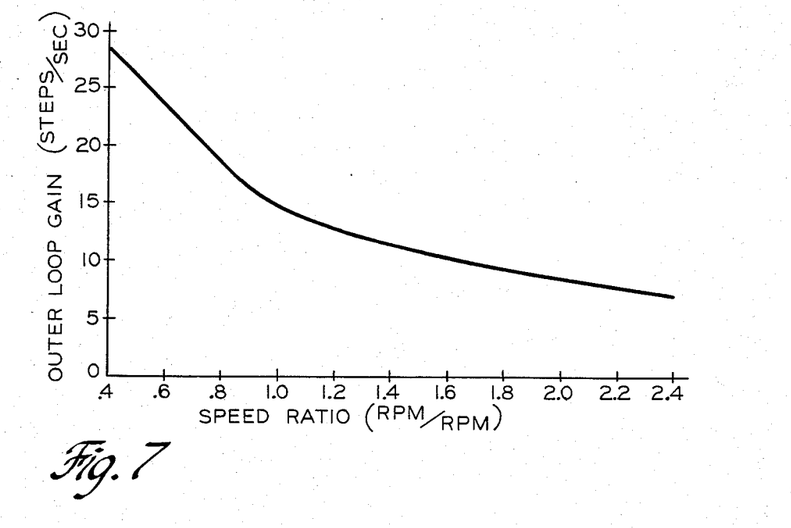
FIG. 7 is a graph depicting the outer loop gain versus actual speed ratio in the slow or stable mode of operation according to a first embodiment of this invention.

FIG. 7 depicts the gain of the outer servo loop in steps/second as a function of speed ratio for region A according to the first embodiment of this invention. Comparing FIGS. 5 and 7, it will be seen that in region A, the outer loop gain is in inverse relation to the inner loop gain. In addition, as will be seen in FIG. 8, the magnitude of the outer loop gain is chosen relative to the magnitude of the inner loop gain to achieve a substantially constant overall gain that corresponds to the desired overall gain of 0.08 ratio/second, as depicted in region A of FIG. 6.

FIG. 10 depicts the overall gain in ratio/second as a function of speed ratio error for regions A and B according to the first embodiment of this invention. As in FIG. 6, the line 200 separates region A and region B speed ratio errors. In region A, the overall gain is not varied as a function of speed ratio error and accordingly is depicted in FIG. 10 as a constant function of speed ratio error. In region B, the overall gain is depicted as a family of curves since the outer loop gain for region B ratio errors does not compensate the overall gain for the non-constant gain of the inner servo loop. Thus, each of the family curves depicted in region B of FIG. 10 are associated with a specified speed ratio value. For example, curve 230 is associated with a speed ratio value of 2.0 RPM/RPM; curve 232 is associated with a speed ratio value of 1.5 RPM/RPM; curve 234 is associated with a speed ratio value of 1.0 RPM/RPM; and, curve 236 is associated with a speed ratio value of 0.5 RPM/RPM. Although only four family curves are shown, it will be appreciated that such curves are only representative and that a separate curve could be constructed for any speed ratio value.

Also shown in FIG. 10 is a dashed curve 240 corresponding to the desired overall gain depicted in FIG. 6. It is seen in FIG. 10 that the overall gain in region A lies directly on the desired overall gain curve 240 since the non-constant gain of the inner servo loop is compensated for region A speed ratio errors. The overall gain in region B, on the other hand, differs from the desired gain curve 240 since the nonconstant inner servo loop gain is not compensated for. Thus, the nonconstant gain of the inner servo loop with respect to speed ratio also appears in the overall gain in region B. Although such variation in overall gain as a function of speed ratio is generally not desirable, this invention recognizes according to one aspect that compensation for such nonconstant gain is most important for relatively small speed ratio errors, such as in region A, where stability is the primary control objective. For relatively large speed ratio errors as in region B where speed of response is the primary control objective, the overall gain variation with respect to speed ratio is less important and does not significantly affect the drivability of the vehicle.

Figure 8:
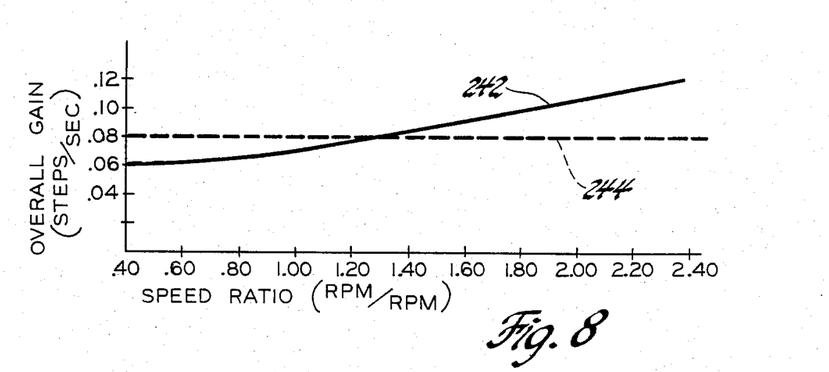
FIG. 8 is a graph depicting the overall gain versus speed ratio in the slow or stable mode of operation according to the first embodiment of this invention.

FIG. 8 depicts the overall gain in steps/second for region A speed ratio errors as a function of speed ratio. The curve 242 represents the actual overall gain, while curve 244 represents the desired overall gain. The vertical gain scale in FIG. 8 is greatly expanded to show any deviation between the actual and desired gain curves, such deviation being so slight that the overall gain is viewed as being substantially constant at the 0.08 steps/second. Thus, the outer servo loop gain depicted in FIG. 7 compensates the overall gain for the nonconstant inner servo loop gain depicted in FIG. 5 so that the overall gain is substantially constant over the entire range of speed ratios, yielding the desired stability.

The second embodiment of this invention differs from the first embodiment described above in that the overall gain of the ratio control system is compensated for the nonconstant inner loop gain over the entire range of speed ratios. As in the first embodiment, the outer loop gain for relatively small speed ratio errors as in region A is varied strictly as a function of the actual speed ratio. Such gain is depicted in FIG. 12 and corresponds to the outer loop gain according to the first embodiment depicted in FIG. 7. For relatively large speed ratio error magnitudes, such as in region B, the outer loop gain is varied according to both speed ratio and ratio error magnitude. Such gain is depicted in FIG. 11 and corresponds to the outer loop gain according to the first embodiment depicted in FIG. 9. FIG. 13 depicts the overall gain in ratio/second for the second embodiment of this invention and corresponds to the overall gain according to the first embodiment depicted in FIG. 10. Due to the increased stability of the second embodiment afforded by the compensation of the inner loop gain for larger speed ratio errors, such as in region B, the reference speed ratio error for defining regions A and B may be lowered to 0.05 RPM/RPM as indicated in FIGS. 11 and 13 by the dashed line 200'.

Referring now to FIG. 11, the outer loop gain in steps/second is depicted as a function of speed ratio error for regions A and B according to the second embodiment of this invention. The gain is depicted as a family of curves, each curve being associated with a specified speed ratio value. Thus, curve 250 is associated with a speed ratio value of 0.64 RPM/RPM; curve 252 is associated with a speed ratio value of 1.28 RPM/RPM; curve 254 is associated with a speed ratio value of 1.92 RPM/RPM; and curve 256 is associated with a speed ratio value of 2.55 RPM/RPM. As noted above respecting FIGS. 9 and 10, it will be understood that such curves are only representative and that a separate curve could be constructed for any speed ratio value. For low speed ratio values, such as 0.64 RPM/RPM, the outer loop gain is limited by the speed of the actuator, as designated on curve 250 by the reference numeral 260. As will later be noted in reference to FIG. 13, which depicts the overall gain in region B, such limiting action prevents complete compensation for the nonconstant inner servo loop gain.

For speed ratio errors in region A, the outer servo loop gain is varied as a sole function of speed ratio as in the first embodiment, and accordingly, the outer loop gain in region A is depicted in FIG. 11 as a constant function of speed ratio error. FIG. 12 depicts the outer loop gain in steps/second as a function of speed ratio for region A according to the second embodiment of this invention. As with the outer loop gain of the first embodiment of this invention, the outer loop gain depicted in FIG. 12 is in inverse relation to the inner loop gain, its magnitude being chosen relative to the magnitude of the inner loop gain so that overall gain in ratio/second corresponds to the desired overall gain of 0.08 ratio/second depicted in FIG. 6.

FIG. 13 depicts the overall gain in ratio/second as a function of speed ratio error for regions A and B according to the second embodiment of this invention. As in FIG. 11, the dashed line 200' separates region A and region B speed ratio errors. In region A, the outer loop gain is varied solely as a function of speed ratio and a plot of overall gain as a function of speed ratio is essentially like that shown in FIG. 8 respecting the first embodiment of this invention.

Due to the limiting action of the ratio actuator as mentioned above in reference to FIG. 11, the outer loop gain in FIG. 13 is depicted as a family of curves according to speed ratio. For speed ratios greater than 1.50 RPM/RPM, the non-constant inner loop gain is completely compensated for and the overall gain is substantially identical to the desired overall gain depicted in FIG. 6. For lower numerical speed ratios, such as 0.64 RPM/RPM, where the inner loop gain is relatively high and where the ratio actuator speed is limited, the overall gain fails to correspond to the desired overall gain depicted in FIG. 6. By using a faster actuator, the overall gain for lower numerical speed ratios could be completely compensated for the nonconstant inner servo loop gain, but a faster actuator is inherently not as accurate. The discrepancy between the actual overall gain and the desired overall gain for low numerical speed ratios is thus a tradeoff which is accepted in order to obtain the accuracy required for stability.

Figures 14A, 14B:
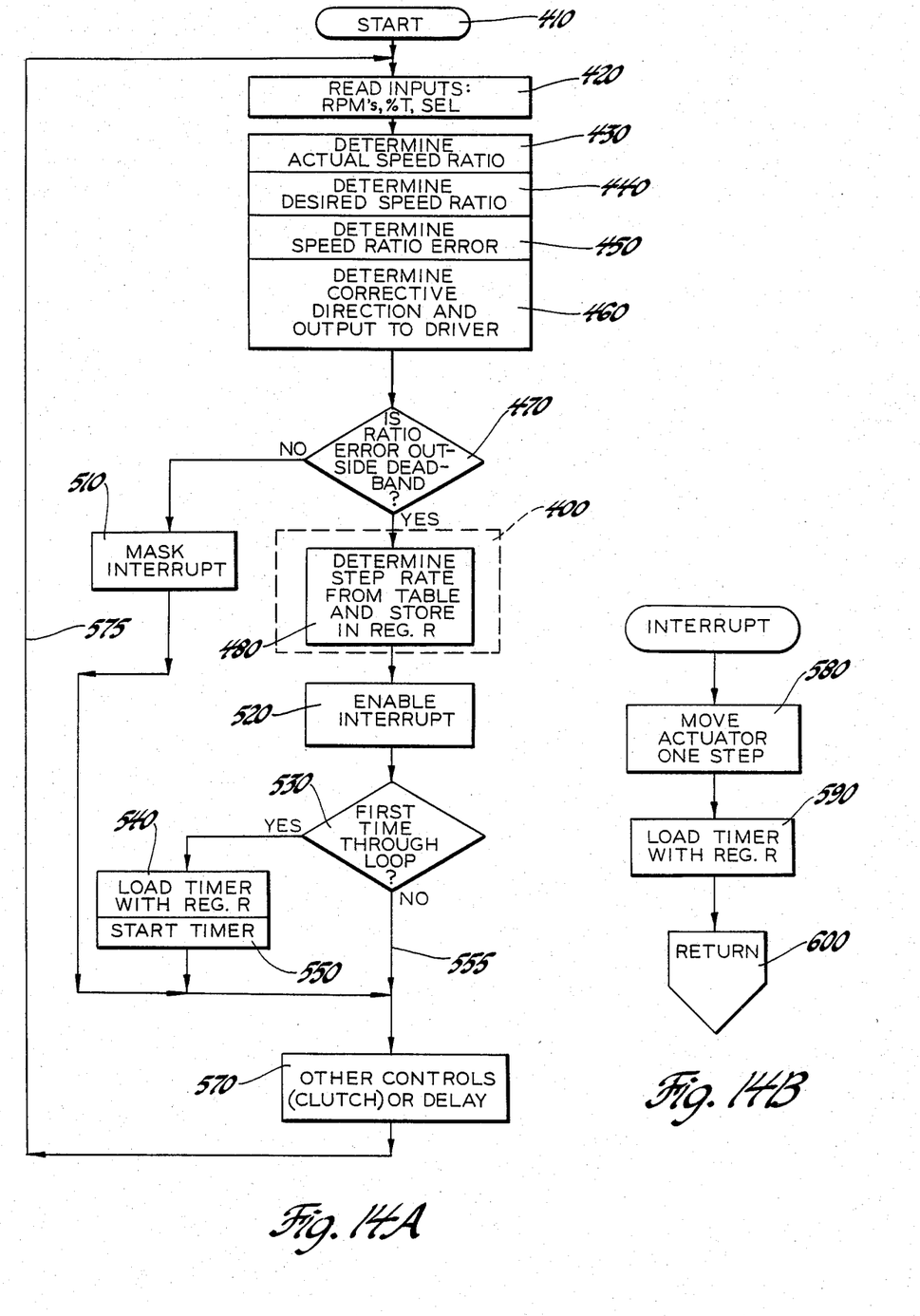
FIGS. 14A and 14B are flow diagrams for implementing the second embodiment of this invention with a programmed microprocessor.
Figure 15:
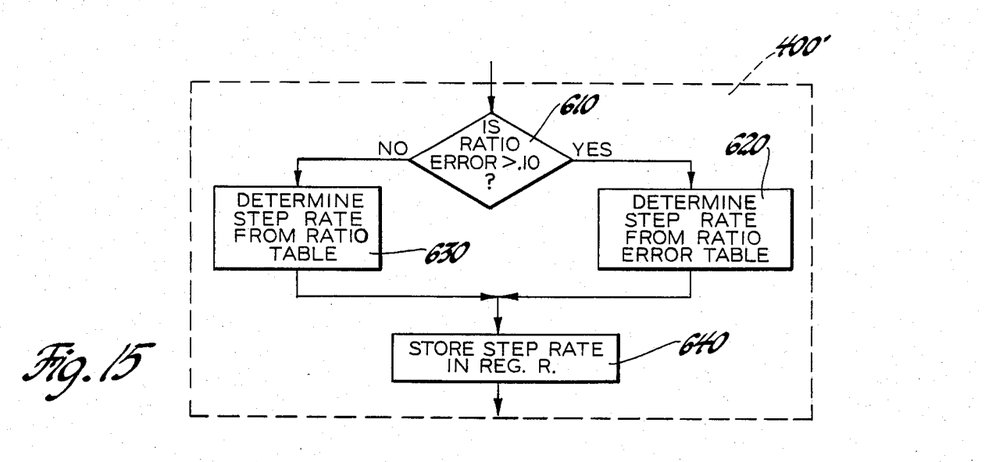
FIG. 15 is a flow diagram for use in conjunction with the flow diagrams in FIGS. 14a and 14b for implementing the first embodiment of this invention with a programmed microprocessor.

FIGS. 14 and 15 are flow diagrams for implementing the control system of this invention with a microprocessor based controller such as depicted in FIGS. 1 and 2 herein. The flow diagram of FIG. 14A represents the Main program loop while the flow diagram of FIG. 14B represents an Interrupt program for the Main program loop. As will be understood by those skilled in the art, MPU 120 normally executes program instructions of the Main loop and such execution is suspended when the Interrupt input of MPU 120 is lowered to a logic zero voltage level. At such time, MPU 120 executes instead the program instructions of the Interrupt program. Following execution of the Interrupt program, MPU 120 resumes execution of the Main program at the point of interruption. As also will be understood by those skilled in the art, suitable program instructions may be employed in the Main loop to inhibit or mask an interrupt signal or to allow an interrupt signal.

As shown in FIG. 2, an output of Timer 126 is connected to the Interrupt input of MPU 120 via line 127. MPU 120 communicates with Timer 126 via buses 130 and 132 in accordance with the program instructions of the Main and Interrupt programs, and operates to load various digital numbers into the timer register and to start and stop the decrementing of the same. When the count in the timer register has been decremented to zero, output line 127 is lowered to a logic zero voltage potential to interrupt execution of the main program and to commence execution of the Interrupt program, assuming that the interrupt is not masked.

The flow diagrams depicted in FIGS. 14A and 14B represent program steps for implementing the second embodiment of this invention wherein non-constant gain of the inner servo loop is compensated over the entire range of speed ratio errors. The flow diagram instructions enclosed in dashed box 400 in FIG. 14A represent a portion of the flow diagram that is peculiar to the second embodiment. A corresponding flow diagram portion for the first embodiment is depicted in FIG. 15 in the dashed box designated by reference numeral 400', which is to be substituted for the instructions in box 400 of FIG. 14A when the first embodiment is employed.

Referring now more particularly to FIG. 14A, start block 410 designates a series of program instructions to be executed each time power is applied to the system. As will be appreciated by those skilled in the art, such block represents program instructions for initializing the various input and control variables. After executing the start instructions, the MPU 120 reads the value of the input signals as indicated at block 420. As noted earlier, such input signals include the engine output speed $N_e$, the transmission input speed $N_i$, the transmission output speed $N_o$, the throttle position signal %T and the manual selector position signal. From the transmission input speed $N_i$ and output speed $N_o$, MPU 120 computes the actual transmission speed ratio ($N_o/N_i$) as indicated at block 430. MPU 120 then determines a desired speed ratio value as indicated at block 440. In this regard, it will be understood by those skilled in the art that the desired ratio values may be stored in an electronic look-up table (not shown), as a function of throttle position and transmission output speed, such values being retrievable when desired by addressing the look-up table with particular throttle position and transmission output speed values. The actual and desired speed ratio values are then differenced to determine the speed ratio error as indicated at instruction block 450. In response to the sign of the speed ratio error, MPU 120 then outputs a digital signal to step motor driver 160 via lines 162 as indicated at instruction block 460 for designating the direction of corrective movement for step motor actuator 98.

According to the second embodiment of this invention, MPU 120 then determines if the speed ratio error is outside a dead-band of ratio errors centered about zero error, as indicated at instruction block 470. The term dead-band is used herein in its commonly accepted meaning and operates to prevent corrective actuation of the transmission ratio unit when the speed ratio error magnitude is less than a predetermined low value such as 0.01 RPM/RPM. If the ratio error is inside the dead-band, the Interrupt input of MPU 120 is masked to prevent the execution of the Interrupt program as indicated at instruction block 510. If the ratio error is outside the dead-band, MPU 120 determines a step rate for step motor actuator 98 as a function of both the speed ratio error and the actual speed ratio, and stores the step rate in a memory register (REG R) as indicated at block 480. Representative step rates for actuator 98 according to the second embodiment of this invention, are depicted herein in FIGS. 11 and 12. As described above in reference to the desired speed ratio, such step rates may be stored in an electronic look-up table addressable as a function of speed ratio error and actual speed ratio. In order to facilitate the implementation of a desired step rate, the step rate values stored in the look-up table actually represent the time between actuator steps. Accordingly, a large step rate value would result in a slow rate of change of ratio, while a small step rate value would result in a fast rate of change of ratio.

After determining the suitable step rate, the Interrupt input of MPU 120 is enabled to permit execution of the Interrupt program as indicated at instruction block 520. MPU 120 then determines, as indicated at decision block 530, if this is the first time since initial power-up that the Main program has been executed. It will be understood that the answer to such question may be determined by checking the status of a flag or other memory location which is initialized by start instructions 410 and which subsequently changes value. The very first time the Main program is executed following the application of power to the system, decision block 530 is answered in the affirmative, and MPU 120 loads Timer 126 with the step rate stored in REG R, as indicated at instruction block 540. MPU 120 then starts the decrementing of Timer 126 as indicated at instruction block 550. After the first execution of the Main program loop, decision block 530 is answered in the negative and instruction blocks 540 and 550 are skipped as indicated by flow diagram line 555.

Instruction block 570 generally designates further control functions performed by MPU 120 such as the energization of clutch actuator 110, clutch lubrication pump 112, and transmission pressure regulator valve 100. Such functions are not directly related to the control system of this invention and therefore are not described in detail. After executing such instructions, MPU 120 returns to instruction block 420, as indicated by flow line 575.

Referring now more particularly to the Interrupt flow diagram depicted in FIG. 14B, instruction block 580 designates program instructions for outputting a command from PIA 122 to step motor driver 160 via lines 162 for moving the output shaft 196 of step motor actuator 98 by one step. The previously outputted direction signal described above in reference to instruction block 460 determines the direction of the corrective action. After moving the actuator output shaft 96, MPU 120 then loads the output register of Timer 126 with the contents of REG R as indicated at instruction block 590. In this way, the timer will next cause an interrupt to move actuator output shaft 96 another step when the digital number in the timer output register is decremented to zero. MPU 120 is then returned to the Main program and begins executing program instructions at the point of interruption as indicated at instruction block 600.

The operation of the control system of this invention will now be described with reference to FIGS. 14A and 14B. It will be seen in reference to such description that the Main program operates to determine a step rate value for the step actuator as a function of the various input signals and to store the updated step rate value in REG R. The interrupt program operates to move the actuator output shaft 96 one step and to update the output register of Timer 126 with the step rate stored in REG R.

After power is initially applied to the system and the input and control variables have been initialized according to the program instructions at start block 410, MPU 120 reads the various input values and determines the speed ratio error. A digital output signal corresponding to the sign of the speed ratio error and indicative of the corrective direction for step motor actuator 98 is then applied to step motor driver 160 via one of the lines 162. Such output does not operate to energize the actuator 98—it only operates to select the direction of corrective action. If the ratio error is within the dead-band of ratio errors, no corrective action is required and the Interrupt input is masked to prevent the execution of the Interrupt program. As long as the interrupt is masked, MPU 120 will ignore the signals applied to its Interrupt input. If the ratio error is outside the dead-band, corrective action of the speed ratio is required and MPU 120 determines a suitable step rate according to the speed ratio error and the speed ratio. In addition, the Interrupt input is enabled to allow the execution of the Interrupt program when the suitable voltage potential is applied to the Interrupt input. The first time that the Interrupt input is enabled to allow a ratio correction, the output register of Timer 126 is loaded with the last determined step rate, and the Timer 126 is enabled to begin decrementing such rate. Such step is necessary the first time through the Main program loop since the register of Timer 126 is normally updated by the Interrupt program. When the step rate representing the time between steps is decremented to zero, Timer 126 generates an interrupt whereupon MPU 120 begins execution of the Interrupt program. In addition to moving the actuator 98 by one step to change the speed ratio, the Interrupt program loads a new step rate value into Timer 126 from register R. The operation of control unit 35 continues in the manner described above until the system is deactivated.

The flow diagram of FIG. 15 represents program instructions to be substituted for the program instructions of FIG. 14A which are outlined by box 400. Accordingly, the program instructions designated by the flow diagram of FIG. 15 begins following the execution of decision block 470, if the ratio error is outside the dead-band. At such point, MPU 120 determines if the ratio error is greater than 0.10 RPM/RPM as indicated at decision block 610. The reference value of 0.01 RPM/RPM is the reference value defined in reference to FIG. 6 for separating the speed ratio error into a region A of speed ratio errors lower than 0.10 RPM/RPM and a region B of speed ratios greater than 1.0 RPM/RPM. If decision block 610 is answered in the affirmative, the speed ratio error is in region B wherein speed of response for drivability is the primary control objective. In such case, MPU 120 determines the step rate as a function of the speed ratio error as indicated at instruction block 620. The ratio error table referred to at instruction block 620 is preferably an electronic look-up table wherein previously stored step rate values may be retrieved as a function of a speed ratio error-determined address. If decision block 610 is answered in the negative, the speed ratio error is in region A wherein the primary control objective is stable response. Accordingly, MPU 120 determines a step rate strictly according to the actual speed ratio as indicated at instruction block 630. As with the ratio error table referred to in instruction block 620, the ratio table referred to in instruction block 630 is preferably an electronic look-up table wherein previously stored step rate values are retrievable using a speed ratio-determined address. Following the execution of instruction blocks 620 or 630, MPU 120 stores the step rate value in REG R as indicated at instruction block 640. At this point, the execution of the program instruction designated by box 400' is complete and MPU 120 proceeds to execute the program instructions represented by instruction block 520 in FIG. 14a. The operation in implementing the first embodiment of this invention is essentially the same as the second, except for the manner in which the step rate value is determined. In both embodiments, the step rate value for speed ratio errors in region A is determined as a sole function of the actual speed ratio. According to the second embodiment, the step rate values for speed ratio errors in region B is determined according to both actual speed ratio and speed ratio error. According to the first embodiment, the step rate values for speed ratio errors in region B is determined as a sole function of the speed ratio error.

In summary, this invention provides a novel and advantageous ratio control system for the outer servo loop of a continuously variable ratio transmission in which the gain of the transmission inner servo loop is a nonconstant function of the speed ratio provided by the transmission. The compromise between stable ratio control response and fast ratio control response which is characteristic of conventional systems is avoided according to this invention by establishing a reference speed ratio error below which stable response is the primary control objective and above which fast response is the primary control objective. For ratio errors requiring stable response, the gain of the outer servo loop is determined relative to the gain of the inner servo loop so as to compensate the overall ratio control gain for the nonconstant nature of the inner servo loop. Such control establishes a substantially constant overall ratio control gain regardless of the actual speed ratio provided by the transmission, such gain being chosen to yield the desired stable response. For ratio errors requiring fast response the outer servo loop gain is determined according to a first embodiment as a sole function of the speed ratio error and according to a second embodiment as a function of both speed ratio error and actual speed ratio. Both the first embodiment and the second embodiment of this invention yield the desired fast response. The first embodiment compensates for the nonconstant nature of the inner loop gain only for ratio errors requiring stable response while the second embodiment compensates for the nonconstant nature of the inner loop gain for all ratio errors requiring correction. In essence, the outer loop gain is not fixed but is variable and is controlled as a function of the actual speed ratio and speed ratio error in a manner to satisfy predetermined control objectives.

Although this invention has been described in reference to the illustrated embodiments, it will be understood that various modifications may occur to those skilled in the art and that such modifications may fall within the scope of this invention which is defined by the appended claims.

The embodiments of the invention in which an exclusive property or privilege is claimed are defined as follows:

1. For a continuously variable speed ratio transmission control system having an inner servo loop for adjusting the transmission speed ratio in accordance with the position of an actuator member, the response of the inner loop being characterized in that the rate of change in speed ratio with respect to actuator position is a nonconstant function of the actual speed ratio, apparatus defining an outer servo loop for adjusting the position of the actuator member in a manner to establish a desired speed ratio in said transmission, comprising:

control means for determining the ratio error according to the difference between the actual speed ratio and the desired speed ratio, and for adjusting the actuator member in a direction to reduce such ratio error, such control means being effective when the ratio error is at or above a predetermined value for regulating the rate of adjustment of said actuator member so that the rate of change in actuator position with respect to time is a direct function of the ratio error to relatively quickly reduce such error to the predetermined value below which further such adjustment would compromise system stability in view of the nonconstant response of the inner servo loop, thereby providing an overall system response with satisfactory shift feel, such control means being further effective when the ratio error is below the predetermined value for regulating the rate of adjustment of said actuator member so that the rate of change in actuator position with respect to time is a nonconstant function of the actual speed ratio and in inverse relationship with the nonconstant function of said inner loop to yield a substantially constant rate of change of speed ratio with respect to time for all actual speed ratio values for relatively slowly reducing such error, thereby bringing the actual speed ratio into correspondence with the desired speed ratio in a stable manner.

2. For a continuously variable speed ratio transmission control system having an inner servo loop for adjusting the transmission speed ratio in accordance with the position of an actuator member, the response of the inner loop being characterized in that the rate of change in speed ratio with respect to actuator position is a nonconstant function of the actual speed ratio, a method of operation which defines an outer servo loop for adjusting the position of the actuator member in a manner to establish a desired speed ratio in said transmission, such method comprising the steps of:

determining the ratio error according to the difference between the actual speed ratio and the desired speed ratio;

adjusting the actuator member in a direction to reduce such ratio error;

regulating the rate of adjustment of said actuator member according to a first engageable mode of operation wherein the rate of change in actuator position with respect to time is a direct function of the ratio error, thereby providing relatively fast overall system response with acceptable shift feel, or a second engageable mode of operation wherein the rate of change in actuator position with respect to time is a nonconstant function of the actual speed ratio, and in inverse relationship with the nonconstant function of said inner loop to yield a substantially constant rate of change of speed ratio with respect to time for all actual speed ratio values, thereby providing stable and consistent overall system response; and engaging said first or second modes of operation so that when the magnitude of the ratio error is at or above a predetermined error value, the first mode of operation is engaged to reduce the ratio error to said predetermined value below which further such adjustment would compromise system stability in view of the nonconstant response of the inner servo loop, and so that when the ratio error is below the predetermined value, the second mode of operation is engaged to reduce the remaining ratio error in a stable manner, whereby the ratio control system is operated in a manner to provide stable response when the ratio error is relatively small without sacrificing speed of response when the ratio error is relatively large.

3. For a continuously variable speed ratio transmission control system having an inner servo loop for adjusting the transmission speed ratio in accordance with the position of an actuator member, the response function of the inner loop being such that the rate of change in speed ratio with respect to actuator position varies according to the actual speed ratio, apparatus defining an outer servo loop for adjusting the position of the actuator member in a manner to establish a desired speed ratio in said transmission, comprising:

control means for determining the ratio error according to the difference between the actual speed ratio and the desired speed ratio, for adjusting the actuator member in a direction to reduce such ratio error when the ratio error exceeds a dead-band ratio error value, and for establishing a predetermined ratio error value substantially in excess of said dead-band ratio error value, above which the primary control objective is to achieve speed of response with acceptable shift feel and below which the primary control objective is to achieve stable response with minimal overshoot of the actual speed ratio with respect to the desired speed ratio, such control means being effective when the ratio error is at or above the predetermined ratio error value for establishing an outer loop response function such that the rate of change of actuator position with respect to time varies in direct relation to the ratio error to yield an overall response function such that the rate of change of speed ratio with respect to time achieves the primary objective of speed of response with acceptable shift feel and when the ratio error is below the predetermined value for establishing an outer loop response function such that the rate of change of actuator position with respect to time varies in relation to the actual speed ratio, such relation being inverse with respect to the response function of said inner loop to thereby yield an overall response function such that the rate of change of speed ratio with respect to time is substantially constant for all actual speed ratio values to achieve the primary objective of stable response with minimal overshoot of the actual speed ratio with respect to the desired speed ratio.

4. For a continuously variable transmission system for a motor vehicle, apparatus for controlling the speed ratio between the input and output shafts of the transmission by driving the actual speed ratio toward a desired speed ratio so as to reduce the ratio error therebetween, the apparatus comprising:

means including an inner servo loop for determining the actual speed ratio in accordance with the position of an actuator such that the rate of change in speed ratio with respect to actuator position is related to the speed ratio by a nonconstant inner loop gain function; and means defining an outer servo loop for adjusting the position of the actuator in accordance with a fast response mode of operation at all times except when the ratio error is sufficiently small that the system would otherwise be in danger of becoming unstable due to the actual speed ratio excessively overshooting the desired speed ratio during which times the adjustment is made in accordance with a stable mode of operation, the rate of change in the position of the actuator with respect to time in the fast response mode of operation being controlled over a first range of rate values in relation to the ratio error and the actual speed ratio according to a first outer loop gain function which is effective in conjunction with the first range of rate values to relatively rapidly drive the actual speed ratio toward the desired speed ratio at an overall rate of change in speed ratio with respect to time that provides a desired shift feel, and the rate of change in the position of the actuator with respect to time in the stable response mode of operation being controlled over a second range of rate values which are generally lower than the first range of rate values, such rate of change being determined in relation to the speed ratio by a second outer loop gain function which is approximately the inverse of the aforesaid nonconstant inner loop gain function and which is effective in conjunction with such nonconstant inner loop gain function to relatively slowly drive the actual speed ratio toward the desired speed ratio at an overall rate of change in speed ratio with respect to time that is approximately constant over the speed ratio range so as to provide system repeatability and that is sufficiently low as to provide system stability by preventing the actual speed ratio from excessively overshooting the desired speed ratio.

* * * * *